W. E. PORTER.
ELECTRIC METER.
APPLICATION FILED FEB. 26, 1917.
1,345,691.
Patented July 6, 1920.
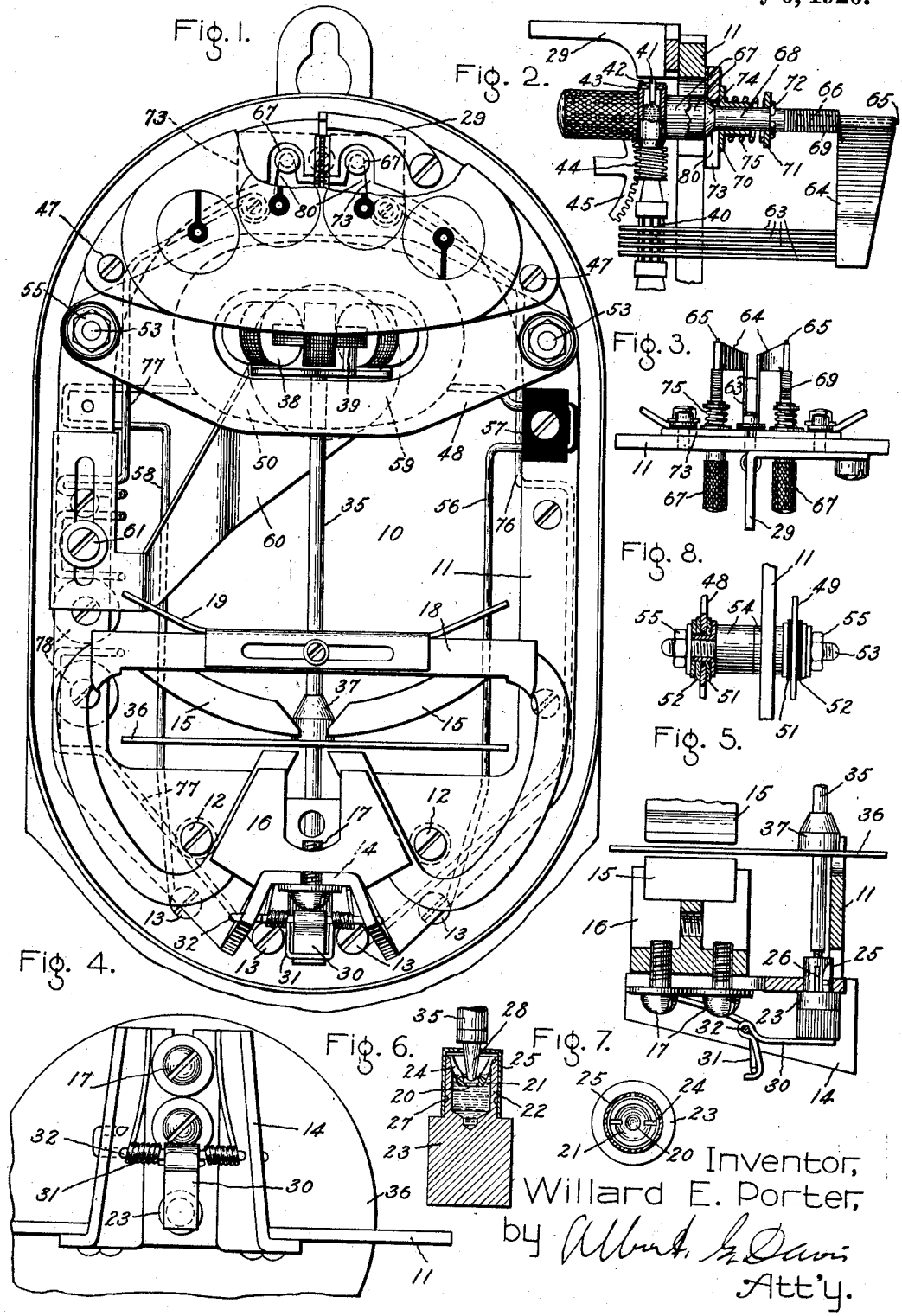
Inventor,
Willard E. Porter,
by Albert G. Davis
Att'y.

UNITED STATES PATENT OFFICE.

WILLARD E. PORTER, OF LYNN, MASSACHUSETTS, ASSIGNOR TO GENERAL ELECTRIC COMPANY, A CORPORATION OF NEW YORK.

ELECTRIC METER.

1,345,691.  Specification of Letters Patent.  Patented July 6, 1920.

Application filed February 26, 1917. Serial No. 151,060.

*To all whom it may concern:*

Be it known that I, WILLARD E. PORTER, a citizen of the United States, residing at Lynn, county of Essex, State of Massachusetts, have invented certain new and useful Improvements in Electric Meters, of which the following is a specification.

My invention relates to electric meters, and has for its object the provision of certain improvements therein. More particularly, my invention relates to electric motor meters of the commutator type, and has for one of its particular objects the provision of an improved brush supporting means. Another object of the invention is to provide an improved lower bearing or jewel support for electric motor meters. Other objects of the invention will be brought out in the course of the following description.

The novel features of the invention which I believe to be patentable are definitely set forth in the appended claims. The manner of construction, arrangement and mode of operation of these features in an electric meter will be understood from the following description taken in conjunction with the accompanying drawings, in which:

Figure 1 is a front elevation, with the cover removed, of an electric meter embodying my present invention; Figs. 2 and 3 are detail views illustrating the improved brush supporting means of my present invention; Fig. 4 is a bottom view of a portion of the meter showing the resilient support for the lower jewel; Fig. 5 is a detail sectional elevation further showing the support for the lower jewel; Figs. 6 and 7 are detail views of the lower jewel construction; and Fig. 8 is a detail view of the support for the stationary field coils of the meter.

The meter illustrated in the accompanying drawings is direct current motor meter of the type described and claimed in the copending application for Letters Patent of the United States of Elihu Thomson Ser. No. 866,043, filed Oct. 10, 1914. The meter has a sheet metal back casing 10. The terminal chamber at the bottom of the casing is not shown in the drawings, since it forms no part of the present invention. A non-magnetic frame 11 of substantially oval configuration carries all of the operative elements of the meter. The frame 11 and the operative elements mounted thereon are assembled in the casing as a single unit, and hence may be removed for inspection or repair as a single unit. Bolts 12 serve to secure the frame to the back casing 10. A bracket 14 projects perpendicularly from the lower part of the frame 11. A pair of permanent damping magnets 15 secured to a shoe 16 are adjustably mounted on the bracket 14 by means of bolts 17 which extend through a slot in the bracket and threaded holes in the shoe. A non-magnetic member 18, preferably of sheet metal, such for example as sheet zinc, is clamped or otherwise suitably secured to the tops of the magnets 15. A magnetic equalizer 19 of soft sheet iron is adjustably mounted on the member 18 and serves to balance the effects of stray fields, as fully described in the aforementioned application of Elihu Thomson.

The lower bearing or jewel support for the movable element of the meter is mounted in the bracket 14. The construction of the lower bearing will be best understood by reference to Figs. 6 and 7, while its mounting in the bracket 14 is best indicated in Figs. 4 and 5 of the drawings. The jewel 20 is mounted in the bottom of a metallic cup 21. The cup is removably mounted in the upper portion of a chamber 22 in a supporting plug 23. The plug 23 has an enlarged head with milled surface, as shown in Fig. 5 of the drawings. The chamber 22 contains a lubricating fluid, such, for example, as oil. The cup 21 is provided with slots 24 through which the lubricant can flow onto the bearing surface of the jewel 20. A cylindrical cap 25 having a couple of slits 26 covers the top of the jewel support. The cap is secured in position by one or more indentations on its inner surface, made, for example, by a small punch, which engage in a circular depression 27 of the plug 23, as will be seen by reference to Figs. 5 and 6 of the drawings. The cap 25 has an opening in its top through which projects the lower pivot point 28 of the rotatable element. The plug 23 extends through a hole in the bracket 14 and is held firmly against the bracket by an L-shaped lever 30 whose work arm is urged toward the bracket by a coil spring 31 mounted on a pin 32 which is secured in the depending sides of the bracket.

The moving element of the meter is carried by a shaft 35 at whose lower end is secured the pivot point 28. A circular damping disk 36 of aluminum or other electrical conducting material having a hub 37 is secured to the shaft 35 so as to rotate in the air gaps of the damping magnets 15. The armature consists of a plurality of coils 38 mounted on an annular magnetic core 39 secured to the shaft by a spider not shown in the drawings. The coils 38 are connected to the segments of a commutator 40 carried near the upper end of the shaft 35.

The upper bearing for the movable element is formed by a stationary pin 41 projecting through a wear plate 42 mounted in an oil chamber 43 at the top of the shaft 35, as clearly shown in Fig. 2 of the drawings. The pin 41 is mounted in an L-shaped bracket 29 secured to the top of the frame 11. A worm gear 44 is formed near the top of the shaft 35 and meshes with the first gear 45 of the reduction gearing for the meter register. The register is secured to the frame 11 by bolts 47.

The meter has two stationary field coils, oval in shape and mounted on opposite sides of the armature. These coils are similarly secured to a front plate 48 and a similar rear plate 49. The front coil 50 is shown in dotted lines in Fig. 1 of the drawings. Each coil is insulated from its plate by a sheet of insulation 51, and each plate is insulated from the frame by a bushing or washer 52 of insulating material. The plates 48 and 49 are thus insulatively mounted on bolts 53. Spacing sleeves and washers 54 properly determine the position of the stationary field coils with respect to the armature, and nuts 55 threaded on the ends of the bolts 53 firmly hold the coils in their proper positions. A conductor 56 passing through a block of insulating material 57 secured to the frame 11 connects one terminal of one field coil to a terminal bolt 13, while one terminal of the other field coil is similarly connected by a conductor 58 to another terminal bolt 13. The other terminals of the field coils are connected together so that the coils are electrically in series. A circular light load coil 59 is mounted at the outer end of an arm 60 adjustably secured to the frame 11 by a bolt 61.

The improved brush supporting means of my present invention is shown in detail in Figs. 2 and 3 of the drawings. The brushes consist of a plurality of wires 63 connected, soldered, for example, at the lower end of two depending metallic vanes 64. The brushes bear on diametrically opposite segments of the commutator in the well understood manner. Since both brush supports are alike, it will be only necessary to describe one. The vane 64 is loosely mounted on a pin 65 extending from a cylindrical boss 66 at the end of an elongated metallic supporting member 67. The pin 65 and the boss 66 are shown in dotted lines in Fig. 2 of the drawings. A second cylindrical boss 68 of slightly greater diameter than the boss 66 is adjacent the latter and terminates in a beveled shoulder 74. A light coil spring 69 surrounds the boss 66 and is soldered at one end to the vane 64 and is soldered at its other end to the boss 68. The spring 69 serves to mechanically hold the vane 64 on the pin 65, and since the elongated support 67 and the spring 66 are of metal the spring provides an electric current path from the support to the vane. A flanged sleeve 70 and a washer 71 are loosely mounted on the boss 68 and are maintained on the boss by a pin 72 extending through the boss and serving as a stop pin. The supporting member 67 is mounted in a slot 80 of a metal plate 73 insulatively secured to the frame 11. The plate 73 is securely held between the beveled shoulder 74 of the member 67 and the flange of the sleeve 70 by means of a spring 75 surrounding the boss 68 and positioned between this flange and the washer 71. It will thus be evident that the member 67 is very easily inserted in and removed from the slot 80 in the plate 73, and when in the slot is firmly held in position by means of the spring 75. By turning the knurled head of the member 67 the tension of the spring 69 can be varied and thus the pressure between the brush and the commutator can be adjusted. One of the plates 73 is electrically connected by a conductor 76 to a third terminal bolt 13, while a divided conductor 77 electrically connects the other plate 73 to the fourth terminal bolt 13. The light load coil 59 and a pair of resistance spools 78 mounted on the frame 11 are included in series relation in the divided conductor 77. The improved brush supporting device of my present invention provides a very advantageous arrangement for conveniently and quickly removing either brush for inspection or repair. The adjustment of the brush pressure by turning the support and thereby varying the tension of the spring 69 may be very conveniently done without removing the brush or altering the operative arrangement of any of the parts of the brush support.

While I have shown and described the best form of my invention now known to me, I desire to have it understood that many modifications may be made by those skilled in the art without departing in any way from the spirit of my invention as disclosed herein. I desire, therefore, to cover in the following claims all such modifications as come within the spirit of my invention.

What I claim as new and desire to secure by Letters Patent of the United States, is,

1. In an electric meter of the commutator type, in combination, a metallic vane adapted to be secured to a brush, a metallic brush support, and a metallic spring surrounding said support and serving to mechanically secure said vane to said support and also to provide an electric current path from said support to said vane.

2. In an electric meter of the commutator type, in combination, a metallic vane adapted to be secured to a brush, a metallic brush support, a metallic spring surrounding said support and serving to mechanically secure said vane to said support and also to provide an electric current path from said support to said vane, and resilient means for securing said support to a fixed part.

3. In an electric meter of the commutator type, in combination, a brush support, a fixed plate having a slot therein, and resilient means for removably securing said support in the slot of said plate.

4. In an electric meter of the commutator type, in combination, a brush support having a portion of reduced section terminating at one end of a shoulder, a flanged sleeve slidably mounted on said portion of reduced section, a fixed plate having a slot therein through which said support extends with said shoulder on one side of the plate and the flange of said sleeve on the other side thereof, and a spring arranged to firmly clamp said plate between said shoulder and the flange of said sleeve.

5. In an electric meter of the commutator type, in combination, a metallic vane adapted to be secured to a brush, a metallic brush support having a portion of reduced section terminating at one end in a shoulder, a metallic spring serving to mechanically secure said vane to said support and also to provide an electric current path from said support to said vane, a flanged sleeve slidably mounted on said portion of reduced section, a fixed plate having a slot therein through which said support extends with said shoulder on one side of the plate and the flange of said sleeve on the other side thereof, and a spring arranged to firmly clamp said plate between said shoulder and the flange of said sleeve.

6. In an electric meter of the commutator type, in combination, a brush support having a shoulder, a member slidably mounted on said support, a fixed plate having a slot therein through which said support extends with said shoulder on one side of the plate and said member on the other side thereof, and a spring operating to force said member toward said shoulder whereby said support is firmly clamped to said plate.

7. In an electric meter of the commutator type, in combination, a metallic vane adapted to be secured to a brush, a metallic brush support having a shoulder, a metallic spring serving to mechanically secure said vane to said support and also to provide an electric current path from said support to said vane, a member slidably mounted on said support, a fixed plate having a slot therein through which said support extends with said shoulder on one side of the plate and said member on the other side thereof, and a spring operating to force said member toward said shoulder whereby said support is firmly clamped to said plate.

8. In an electric meter of the commutator type, in combination, a brush support having a portion of reduced section terminating in a shoulder, a flanged sleeve and a washer mounted on said portion of reduced section, a spring tending to force said sleeve and said washer apart, means limiting the movement of said washer away from said sleeve, and a fixed plate having a slot therein through which said support extends with said shoulder on one side of the plate and the flange of said sleeve on the other side thereof.

9. In an electric meter of the commutator type, in combination, a brush support having a portion of reduced section, a pin projecting from said portion of reduced section, a metallic vane loosely mounted on said pin and arranged to carry a brush, and a metallic spring surrounding said portion of reduced section and serving to mechanically secure said vane to said support and also to provide an electric current path from said support to said vane.

10. In an electric meter of the commutator type, in combination, a brush support, a pin projecting from said support, a metallic vane loosely mounted on said pin and arranged to carry a brush, and a metallic spring surrounding said support and serving to mechanically secure said vane to said support in a definite position and also to provide an electric current path from said support to said vane.

11. In an electric meter of the commutator type, in combination, a brush support having a portion of reduced section terminating in a shoulder, a pin projecting from said support, a metallic vane loosely mounted on said pin and arranged to carry a brush, a metallic spring serving to mechanically secure said vane to said support and also to provide an electric current path from said support to said vane, a flanged sleeve and a washer loosely mounted on said portion of reduced section, a spring tending to force said sleeve and said washer apart, means limiting the movement of said washer away from said sleeve, and a fixed plate having a slot therein through which said support extends with said shoulder on one side of the plate and the flange of said sleeve on the other side thereof.

In witness whereof I have hereunto set my hand this 23rd day of February, 1917.

WILLARD E. PORTER.